(12) United States Patent
Moody et al.

(10) Patent No.: US 7,279,092 B2
(45) Date of Patent: Oct. 9, 2007

(54) UV WASTEWATER TREATMENT DEVICE

(75) Inventors: Kenneth W. Moody, 2136 7th Ave. SW., Puyallup, WA (US) 98371; Janet L. Dally, 2136 7th Ave. SW., Puyallup, WA (US) 98371

(73) Assignees: Kenneth W. Moody, Puyallup, WA (US); Janet L. Dally, Puyallup, WA (US)

( * ) Notice: Subject to any disclaimer, the term of this patent is extended or adjusted under 35 U.S.C. 154(b) by 311 days.

(21) Appl. No.: 11/043,236

(22) Filed: Jan. 26, 2005

(65) Prior Publication Data

US 2006/0163168 A1    Jul. 27, 2006

(51) Int. Cl.
    *C02F 1/32*    (2006.01)

(52) U.S. Cl. .................... 210/170.08; 250/436

(58) Field of Classification Search ........... 210/748, 210/170.08, 232, 532.2; 422/24, 186.3; 250/432 R, 250/435, 436
    See application file for complete search history.

(56) References Cited

U.S. PATENT DOCUMENTS

| | | | |
|---|---|---|---|
| 2,189,279 A * | 2/1940 | Bitner | ........................ 99/451 |
| 4,172,799 A | 10/1979 | Perry, Jr. | |
| 4,230,578 A | 10/1980 | Culp | |
| 4,274,970 A | 6/1981 | Beitzel | |
| 4,501,665 A | 2/1985 | Wilhelmson | |
| 4,715,966 A | 12/1987 | Bowman | |
| 5,180,499 A | 1/1993 | Hinson | |
| 5,563,585 A | 10/1996 | MacDonald | |
| 5,569,387 A | 10/1996 | Bowne | |
| 5,738,780 A * | 4/1998 | Markham | .................... 210/143 |
| 5,840,196 A * | 11/1998 | Laurent | ...................... 210/748 |
| 5,904,847 A | 5/1999 | Bovington | |
| 6,120,691 A | 9/2000 | Mancil | |
| 6,217,752 B1 | 4/2001 | Coots | |
| 6,217,760 B1 | 4/2001 | Bovington | |
| 6,296,775 B1 * | 10/2001 | Moody et al. | ............. 210/748 |
| 6,461,520 B1 | 10/2002 | Engelhard | |
| 6,552,351 B2 | 4/2003 | Vitt | |
| 6,565,743 B1 | 5/2003 | Poirier | |
| 6,607,672 B2 | 8/2003 | Koslow | |
| 2002/0070177 A1 | 6/2002 | Kozlowski | |
| 2006/0283793 A1 * | 12/2006 | Reiling | .................... 210/532.2 |

\* cited by examiner

*Primary Examiner*—Frank M. Lawrence

(57) ABSTRACT

An improved apparatus for UV wastewater purification in septic tank systems disposed in piping located between tank and drainfield and method for use, comprised of an inlet end, removable for cleaning, a descending section, a connecting section, a vertical section, with outflow tube, and containing a UV light, having provision for preventing removal when illuminated, with protective tube spanning its vertical length, with a built-in bottom insert with ports therein to restrict passage of solids and a built-in top insert with a port therein to hold the UV socket and photocell which communicates to a remote control panel.

7 Claims, 4 Drawing Sheets

UV WASTEWATER TREATMENT DEVICE

CROSS-REFERENCE TO RELATED APPLICATIONS

U.S. Pat. No. 6,296,775 B1 issued Oct. 2, 2001

STATEMENT REGARDING FEDERALLY SPONSORED RESEARCH OR DEVELOPMENT

NONE

Reference to a "Sequence Listing," a table, or a computer program listing appendix submitted on a compact disc (see 37 CFR 1.52(e)(5)): NONE

BACKGROUND OF THE INVENTION (1) Field of the Invention

This invention relates generally to UV treatment of waste water from septic tank systems and more particularly to an improved means maximizing the effectiveness of the UV light, establishing safety protection for maintainers, and provision of remote control and monitoring the effectiveness of the process and method therefore.

(2) Description of Related Art including Information Disclosed under 37 CFR 1.97 and 1.98

It has been long established that wastewater from septic systems needed to be purified before passing it to the drain field. Originally, the effluent was treated by exposure to the air with various types of filtering, such as T. Carlson U.S. Pat. No. 5,738,781, Jowett et al U.S. Pat. No. 5,707,513, and Vandervelde U.S. Pat. No. 5,632,896. Various efforts at increasing the aerobic biodegradation process, such as agitation, R. E. Stuth U.S. Pat. No. 5,620,602, or ozonating the wastewater, J. LaRaus U.S. Pat. No. 4,250,040 were tried. Finally, chlorination was used to purify the waste water, which had to be de-chlorinated before discharge.

The foregoing pre-treatment methods are effective at removing from 70% to 85% of the harmful microorganisms. It is now known that irradiation of the wastewater with Ultraviolet can complete the purification process and is particularly effective at eliminating *E.Coli* and various forms of fecal coli form bacteria.

Previous attempts to apply UV treatment to septic system wastewater have involved either broad band UV illumination, A. Wekhof U.S. Pat. No. 5,144,146 or elaborate re-treatment of the wastewater, International Patent WO 84/03880, or combining agitation, European Patent No. EP 202,820, or ultrasound cleaning of the UV light cover, E. A. Pedziwiatr U.S. Pat. No. 4,728,368. All of the foregoing are discussed in applicants' U.S. Pat. No. 6,296,775 B1.

Previous attempts to satisfy the objects of the present improvement have entailed remote monitoring, E. E. Koslow, U.S. Pat. No. 6,607,672B2, H. Kozlowski, U.S. Pat. No. 2002/0070177A1, and R. E. Culp, U.S. Pat. No. 4,230,578. Additional efforts have included lining the inner surface with reflective material, W. Vitt, U.S. Pat. No. 6,552,351 B2, and access means to maintain the UV light, G. K Bowman U.S. Pat. No. 4,715,966 and T. L. Coots U.S. Pat. No. 6,217,752B1.

None of the above inventions and patents, taken either singly or in combination, is seen to describe the instant improvement invention as claimed.

BRIEF SUMMARY OF THE INVENTION

However, the specific objects of providing a device for UV treatment of wastewater which minimizes the cost and complexity of the device, provides safety elements to protect maintainers and enables remote monitoring of effectiveness of the UV treatment and remote control of the operation of the device have not been satisfied until the present invention. This is an apparatus for UV wastewater purification in septic tank systems, comprised of an Ultraviolet light bulb of approximate 30 inch length, encased in a clear crystal protective tube fitted with a protective cap at the bottom end and fixedly attached to a UV socket and suspended from a UV socket port in a top insert in the vertical treatment chamber, which vertical treatment chamber is limited by a bottom insert with ports therein through which wastewater flows into the vertical treatment chamber, around the UV protective tube up to no more than one inch above the bottom of the outflow pipe, determined by its location at the level of the septic tank outflow pipe, and then passes along the outflow pipe, being irradiated from above by the UV light, into the drain field. The portion of the UV light held above the top insert by a UV light retainer impinging in the UV socket port is removably encased in an UV shield having a photocell port there through, through which is removably retained the threaded end of the photocell to sense when the UV light is illuminated, which photocell is electrically connected at the unified plug, to which is also connected the main electrical lead to the UV socket, to the watertight electrical connection through the cap of the 30 inch long 6 inch diameter PVC straight pipe which extends above ground level, and extends to a remote monitor and control box containing a ballast having 120 volt 60 Hz input.

There are certain principals of effective treatment of wastewater with UV radiation which must be satisfied to maximize the treatment process while minimizing the cost thereof. First, the maximum effective treatment range of a UV light is 3 inches so the tube in which the UV light is located should be no larger than 4 inches in diameter. Second, the UV radiation effectiveness is increased where there is air between the light and the flow of the wastewater, provided the waste water is no deeper than one inch. Third, remote monitoring and control can be accomplished up to 40 feet when 18 gauge wire is used combined with an electronic ballast having an input of 120 volts and 60 Hz and the UV system is operated on low voltage which can be mated with a visual and audible alarm to indicate non-operation of the UV light and automatically turn off the system pump.

Perhaps no portion of this improvement is more important than the provision to require disconnection of power from the UV light in order to access the system. It is well known that exposure of the human eye to UV rays can result in blindness. Previous systems for UV treatment of wastewater from septic tank systems did not incorporate any safety provision for those who were required to access the system to clean and/or repair components. This invention satisfies this objective by providing a UV shield over the length of the UV light, which extends above the top insert, and the UV socket cord is limited in length so that the UV light cannot be physically removed from the top insert without unplugging it from the unified plug.

The invention, both as to its composition and method of operation, together with further objectives and advantages thereof, may best be understood by reference to the following description taken in connection with the accompanying drawings. Improvements to this invention will be obvious to those skilled in the art based upon these disclosures and said obvious improvements are intended to be and are encompassed in the scope of the claims herein.

DETAILED DESCRIPTION OF THE INVENTION

Figure 1:
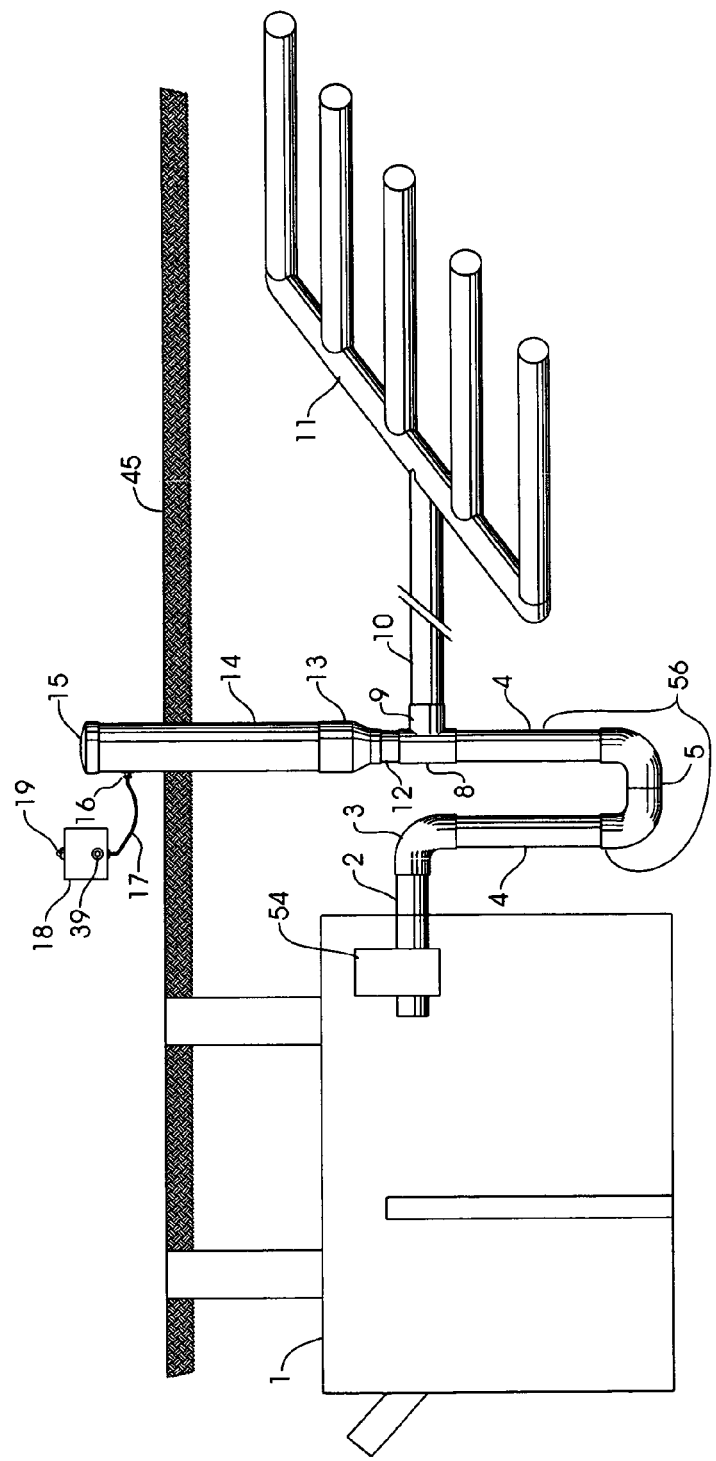
FIG. 1 is an elevational view of the invention installed between a septic tank and a drain field.

FIG. 1 shows a preferred embodiment of the invention installed between a septic tank (1), having a system pump (54), and the outflow pipe (10) to its drain field (11) beneath ground level (45) with only a portion of the 30 inch long 6 inch diameter PVC straight pipe (14) and the 6 inch PVC cap (15), from which runs an electrical wire (17) to a remote control box (18) with an alarm light (19) on top of box, extending above ground level (45).

Figure 2:
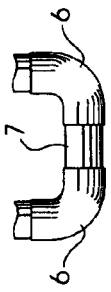
FIG. 2 is a sectional elevational view of an alternative composition of the 180 degree curved PVC connector.
Figures 3, 3A:
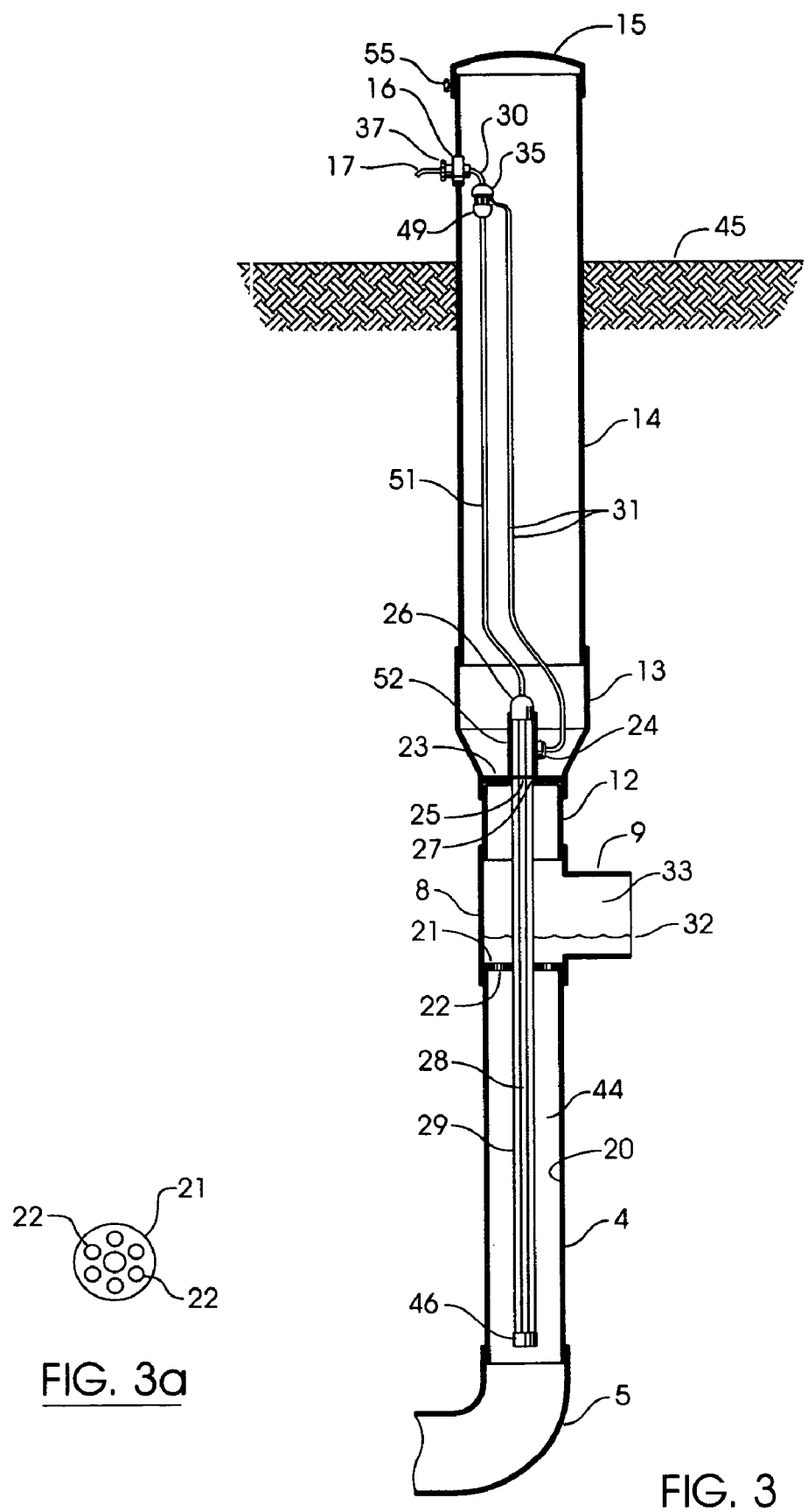
FIG. 3 is a sectional elevational view of the inside of the vertical treatment chamber.
FIG. 3*a* is a plane view of the bottom insert.

With specific reference to FIGS. 2 and 3, the details of the preferred embodiment are shown. The improved apparatus for UV wastewater purification is installed between the septic tank (1) and the drain field (11) at such a depth below ground level (45) so that the elbow (3) communicates with the septic tank outflow pipe (2) resulting in the maximum level of the outflow water level (32) being no more than one inch above the bottom of the outflow arm (9) of the PVC 'T' fitting (8).

With specific reference to FIG. 3, the preferred embodiments of the UV portion of the apparatus are shown, an inflow section (56), comprising a 180 degree curved PVC connector (5), fabricated from the two 90 degree PVC 4 inch diameter elbows (6) and the 4 inch diameter PVC straight pipe (7) of FIG. 2, through which the water from the septic tank outflow pipe (2) flows into the vertical treatment chamber (44), comprised of an 24 inch long 4 inch PVC straight pipe (4), lined with a removable reflector (20) of suitable material such as stainless steel, ending with a bottom insert (21) spanning its outflow end, having ports (22) through its face to allow passage of the water to be treated while restraining the passage of solids and a port (22) located in its center to accommodate the passage of a UV light (28) and protective tube (29), which extends nearly the length of the 24 Inch long 4 inch PVC straight pipe (4) and ends in a tube protector (46) and extends above the bottom insert (21) through a 4 inch diameter PVC fitting (8), a 3¾ inch long PVC straight pipe (12) extending there from on the leg opposite to the bottom insert (21), through the UV socket port (27) in the top insert (23) at the end of the 3¾ inch long PVC straight pipe (12), in which UV socket port (27) it is held removably secure by means of a UV light retainer (25) so that the UV light (28) and its protective tube (29) is so suspended so that its rays can irradiate the waste water throughout the length of the 24 inch long 4 inch PVC straight pipe (4) and the 4 inch diameter PVC 'T' fitting (8) so that it radiates from above the top of the outflow water level (32) in the air space (33) of the outflow arm of the PVC 'T' fitting (9), thereby maximizing the treatment, said UV light having two tube electrical stringers (48) along its length and tube bumpers (47) around its exterior circumference, regularly spaced along its length to prevent damage from the UV light (28) coming in contact with the protective tube (29), and said UV light communicating via a UV tube connector (50) with a UV socket above the top insert (23) and within the space formed by the communication of the 6 inch to 4 inch diameter PVC reducer (13) mated to the top of the 4 inch diameter PVC 'T' fitting (8) and communicating to the 30 inch long 6 inch diameter PVC straight pipe (14) which extends above the ground level (45) and to which is removably attached a 6 inch PVC cap (15), retained by a screw (55).

Figure 4:
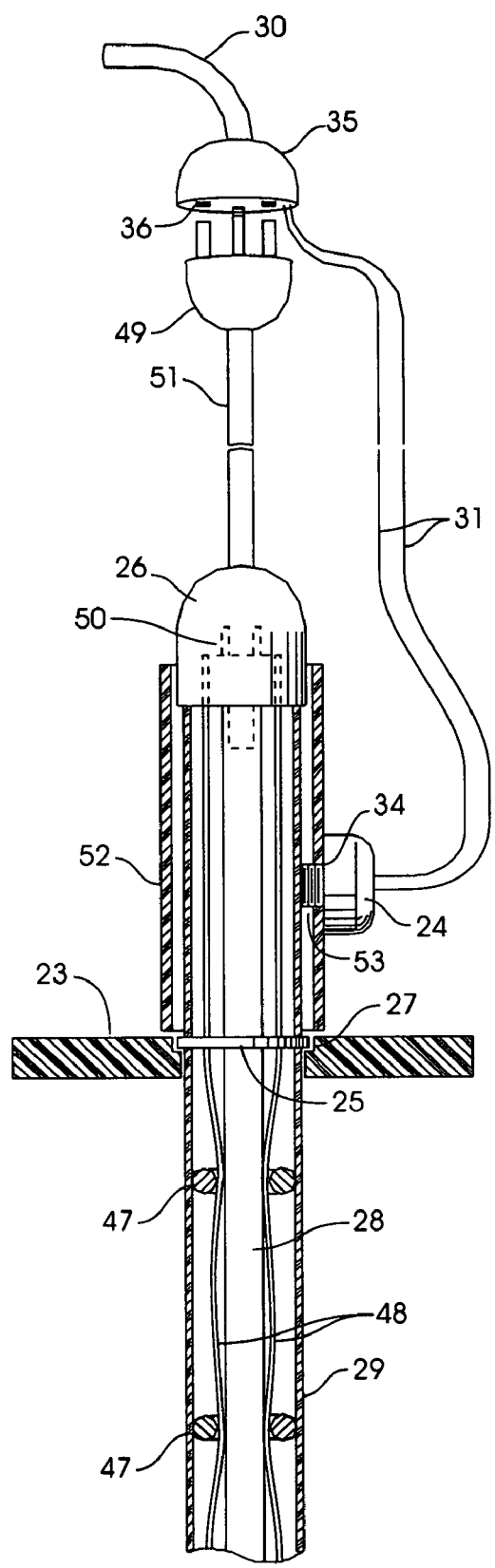
FIG. 4 is a sectional elevational view of the electrical leads inside of the 30 inch long 6 inch diameter PVC pipe.
Figure 5:
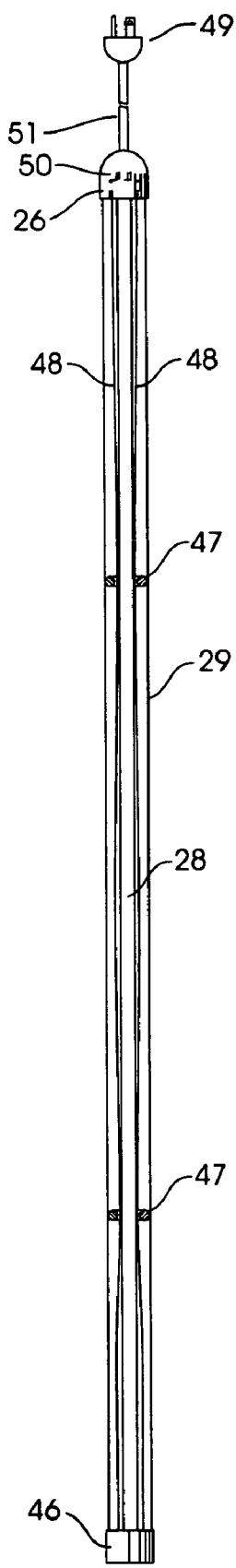
FIG. 5 is a sectional elevational view of the UV light and socket assembly.
Figure 6:
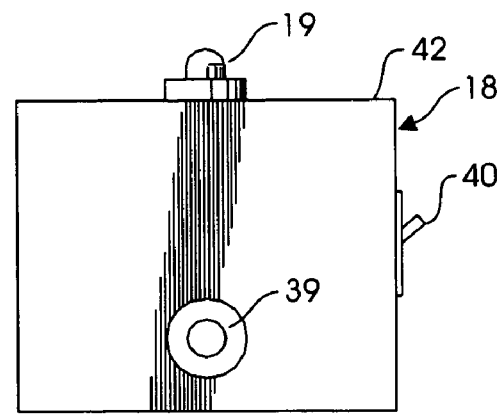
FIG. 6 is a front elevational view of the cover of the control box.
Figure 7:
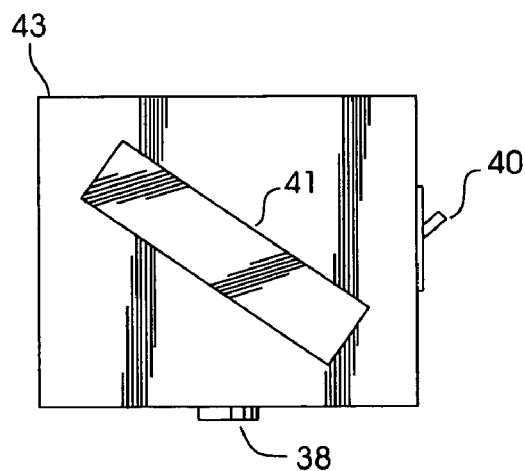
FIG. 7 is a front elevational view of the inside of the box of the control box.

With specific reference to FIGS. 4 & 5, the preferred embodiment of the safety element of the invention is shown, being comprised of a UV shield (52) which extends from the top insert (23) the length of the UV light (28) which extends there above to the UV socket (26), and has a photocell port (34) along its length of appropriate size to removably accommodate the threaded end (53) of the photocell (24), so that it can sense whether the UV light (28) is illuminated, and two electrical wires (31) communicating there from to the unified plug (35) to carry the signal indicating the illuminated status of the UV light (28) to a remote control device as demonstrated in FIGS. 6 & 7, the UV socket being powered through an UV socket cord (51) of such predetermined length so that the UV light (28) cannot be removed from the top insert (23) unless the male plug (49) at its end is detached from the unified plug (35) and its female receptacles (36), which unified plug communicates by electrical wire means (30) through the sidewall of the 30 inch long 6 inch diameter PVC straight pipe (14) and water tight electrical connection (16) with nut means (37) and electrical wire (17) to the plug-in (38) in the remote control box (18), being comprised of a box (43) and cover (42) controlled by a toggle switch (40) to select automatic function or off, with the UV socket cord (51) and electrical wires to the photocell (31) connected to a ballast (41), as is the power to the system pump (54), so that should the UV light (28) go out, the photocell (24) detects it and communicates said failure via the electrical wires to the photocell (31) to the ballast (41) resulting in the illumination of an alarm light (19) on the cover (42) of the control box (18) and automatically turning off the power to the system pump (54), said alarm light (19) being provided with a reset button (39) to manually recharge the system.

The preferred embodiment for the UV light (28) is a Ster-L-Ray Germicidal Lamp, GPH 793T5L/4, produced by Atlantic Ultraviolet Corporage, Hauppauge, N.Y., USA.

The foregoing disclosure and description of the invention are illustrative and explanatory thereof and, it will be understood by those skilled in the art, that various changes in the size, shape and materials, as well as in the details of the illustrated construction, may be made within the scope of the appended claims without departing from the scope or spirit of the invention.

We claim:

1. An improved apparatus for UV wastewater purification in septic tank system having a septic tank and a drainfield, the apparatus being adapted for placement underground between a septic tank outflow pipe end of a septic tank and a drainfield, the apparatus comprising:

a) an assembly of continuous polyvinyl chloride (PVC) piping, of no more than 4 inches internal diameter in the area of active treatment, comprised of an inflow section which includes a straight septic tank outflow pipe, a 90 degree elbow attached thereto, a 24 inch long straight pipe attached thereto and extending downward vertically to communicate with a means to reverse direction 180 degrees, and a vertical treatment chamber comprised of a 24 inch long straight pipe attached thereto and extending upward vertically to communicate with a 4 inch diameter PVC 'T' fitting, so located so that the outflow arm of the PVC 'T' fitting and outflow pipe at their bottom is no more than one inch below the top of the wastewater flowing out of the septic tank outflow pipe, with the top leg of the 'T' communicating through a 3¾ inch long PVC straight pipe to a 6 inch to 4 inch diameter PVC reducer to a 30 inch long 6 inch diameter PVC straight pipe which extends to above ground level and is removably fitted with a 6 inch waterproof PVC cap;

b) an ultraviolet (UV) lamp means emitting ozone free ultraviolet radiation in a wavelength range having a bactericidal effect, including a power means, a means to monitor, and a means to control the ultraviolet lamp and septic tank system operation;

c) a means to prevent inadvertent exposure of personnel maintaining the apparatus from exposure to UV radiation with resultant risk of blindness;

d) a bottom insert, having a plurality of ports there through, fixedly installed in the assembly of continuous polyvinyl chloride (PVC) piping, just downstream from the means to reverse direction 180 degrees, to prevent passage of particulate from the outflow of the septic tank from entering the area of the UV lamp means and act as a flow restrictor thereto;

e. a top insert, having a UV socket port there through, fixedly installed in the assembly of continuous polyvinyl chloride (PVC) piping at the point of mating of the 3¾ inch long PVC straight pipe to the 6 inch to 4 inch diameter PVC reducer to a 30 inch long 6 inch diameter PVC straight pipe which extends to above ground level and removably fitted with a 6 inch waterproof PVC cap, from which the UV lamp means extends downward, and f. a means for monitoring the illumination of the UV lamp means remotely and for controlling the operation of the UV lamp means and septic tank system.

2. The apparatus of claim 1, wherein the means to reverse direction 180 degrees from the 24 inch long 4 inch PVC straight pipe inflow section to the 24 inch long 4 inch PVC straight pipe section of the vertical treatment chamber is comprised of a 90 degree 4 inch diameter PVC elbow, a 4 inch diameter PVC straight pipe, and a 90 degree 4 inch diameter PVC elbow.

3. The apparatus of claim 1, wherein the power means and means to prevent inadvertent exposure of personnel maintaining the apparatus to UV radiation with resultant risk of blindness is comprised of an electrical power wire from a remote control box which communicates through a water tight electrical connection, through the top wall of the 30 inch long 6 inch diameter PVC straight pipe, in the area which is covered by the 6 inch PVC cap when it is in place, to an electrical wire ending in a unified plug, through which power travels through a UV socket cord to a UV socket and from which electrical wires carry power to and signals from a photocell set in a UV shield, which is comprised of a solid tube of sufficient length and diameter to fully cover the portion of the UV light from a UV light retainer, in the UV socket port in the top insert, to the UV socket so that no UV light rays escape there from, with the UV socket cord being of a predetermined length so that the UV light cannot be removed from the top insert unless it is unplugged from the unified plug thus turning off the UV light before it can be withdrawn from the UV shield.

4. The apparatus of claim 1, wherein the means for monitoring the illumination of the UV lamp means remotely and controlling the operation of the UV lamp means and septic tank system is comprised of a photocell, removably installed in a threaded photocell port in a UV shield, which electrically communicates, through a unified plug, having female plug receptacles, in an electrical wire to the UV lamp means, which sends an electrical signal to a remote control box, having an audible and visual warning means which activate when the UV lamp means is not illuminated, and a resultant electrical impulse to a control for the septic tank system to automatically shut it down when the UV lamp means is not illuminated.

5. The apparatus of claim 1, wherein the ultraviolet (UV) lamp means, emitting ozone free ultraviolet radiation in a wavelength range having a bactericidal effect, including a power means, a means to monitor and control the ultraviolet lamp and septic tank system operation, is comprised of a UV light, 31 inches in length, encased in a quartz crystal protective tube which has tube protection means at the end nearest the bottom insert, as well as a tube bumper and tube stringer means to protect it from damage by coming in contact with the quartz crystal protective tube and communicates through a UV tube connector to form a single unit to a UV socket with a short UV socket cord and male plug which mates with female plug receptacles In a unified plug, which is removably suspended from a UV socket port in the center of the top insert, the combination of the UV light, protective tube, UV tube connector and UV socket being permanently bonded together so that the entire combination is replaced when necessary, so arranged that the top of the surface of the wastewater does not extend to cover the top portion of the UV light so that the waste water is irradiated not only from the submerged portion of the UV light, but from above by the unsubmerged portion of the UV light as the wastewater flows out the outflow arm of the PVC 'T' fitting to the outflow pipe to the drainfield.

6. The apparatus of claim 5, wherein the protective tube is comprised of transparent Teflon (polytetrafluoroethylene).

7. The apparatus of claim 1, wherein the inside of the vertical treatment chamber is lined with a sheet of reflective material.

* * * * *